United States Patent
Nagata et al.

(10) Patent No.: US 9,532,349 B2
(45) Date of Patent: Dec. 27, 2016

(54) RADIO COMMUNICATION SYSTEM, BASE STATION APPARATUS, TERMINAL APPARATUS AND RADIO COMMUNICATION CONTROL METHOD

(71) Applicant: NTT DOCOMO, INC., Tokyo (JP)

(72) Inventors: Satoshi Nagata, Tokyo (JP); Nobuhiko Miki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/370,786

(22) PCT Filed: Jan. 23, 2013

(86) PCT No.: PCT/JP2013/051333
§ 371 (c)(1),
(2) Date: Jul. 7, 2014

(87) PCT Pub. No.: WO2013/115037
PCT Pub. Date: Aug. 8, 2013

(65) Prior Publication Data
US 2014/0355470 A1    Dec. 4, 2014

(30) Foreign Application Priority Data

Jan. 30, 2012  (JP) .............................. 2012-017277

(51) Int. Cl.
*H04B 7/185*    (2006.01)
*H04W 72/04*    (2009.01)
(Continued)

(52) U.S. Cl.
CPC ........... *H04W 72/042* (2013.01); *H04W 24/08* (2013.01); *H04W 52/143* (2013.01);
(Continued)

(58) Field of Classification Search
CPC ........ H04W 52/54; H04W 24/08; H04W 4/06; H04W 72/04; H04W 56/00; H04W 56/001; H04W 72/0446; H04W 88/08; H04W 72/082; H04W 52/143; H04L 5/0023; H04B 7/0689
(Continued)

(56) References Cited

U.S. PATENT DOCUMENTS 8,472,539 B2 * 6/2013 Ko ........................ H04L 5/0023
                                                              375/260
8,948,109 B2 * 2/2015 Lee ..................... H04W 52/143
                                                              370/260
(Continued)

OTHER PUBLICATIONS

International Search Report for corresponding International Application No. PCT/JP2013/051333, mailed Feb. 26, 2013 (1 page).
(Continued)

*Primary Examiner* — Hanh N Nguyen
(74) *Attorney, Agent, or Firm* — Osha Liang LLP

(57) ABSTRACT

The present invention is designed to maintain reduced interference in a layered network like a HetNet and improve the overall system throughput performance. A radio base station apparatus has a normal/ABS pattern determining section (2041) that determines a power ratio pattern that shows the power ratio between a reference signal (CRS) and a shared data channel signal (PDSCH) in each subframe, and a transmitting/receiving section (203) that transmits identification information for identifying the power ratio of each subframe in accordance with the determined power ratio pattern.

6 Claims, 14 Drawing Sheets

(51) Int. Cl.
| | |
|---|---|
| H04W 24/08 | (2009.01) |
| H04W 52/14 | (2009.01) |
| H04W 52/16 | (2009.01) |
| H04W 52/24 | (2009.01) |
| H04W 52/32 | (2009.01) |
| H04W 72/12 | (2009.01) |
| H04W 16/16 | (2009.01) |
| H04W 84/04 | (2009.01) |
| H04L 5/00 | (2006.01) |

(52) U.S. Cl.
CPC ......... *H04W 52/16* (2013.01); *H04W 52/244* (2013.01); *H04L 5/001* (2013.01); *H04L 5/005* (2013.01); *H04L 5/0073* (2013.01); *H04L 5/0094* (2013.01); *H04W 16/16* (2013.01); *H04W 52/325* (2013.01); *H04W 72/1273* (2013.01); *H04W 84/045* (2013.01)

(58) Field of Classification Search
USPC ............... 370/318, 328–333, 341, 319, 344, 431,370/432; 455/450, 436–439, 442, 443, 13.4
See application file for complete search history.

(56) References Cited

U.S. PATENT DOCUMENTS

2011/0116437 A1* 5/2011 Chen .................... H04B 7/0689
370/312
2015/0126237 A1* 5/2015 Nagata .................. H04W 52/54
455/522

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).
Extended Search Report issued in corresponding European Application No. 13743448.6, mailed Jun. 30, 2015 (6 pages).
New Postcom; "Performance evaluation of FeICIC with reduced power in ABS"; 3GPP TSG RAN WG1 Meeting #67, R1-113704; San Francisco, USA; Nov. 14-18, 2011 (4 pages).
Ericsson et al.; "On air interface changes for FeICIC"; 3GPP TSG-RAN WG1 #67, R1-114299; San Francisco, USA; Nov. 14-18, 2011 (2 pages).

* cited by examiner

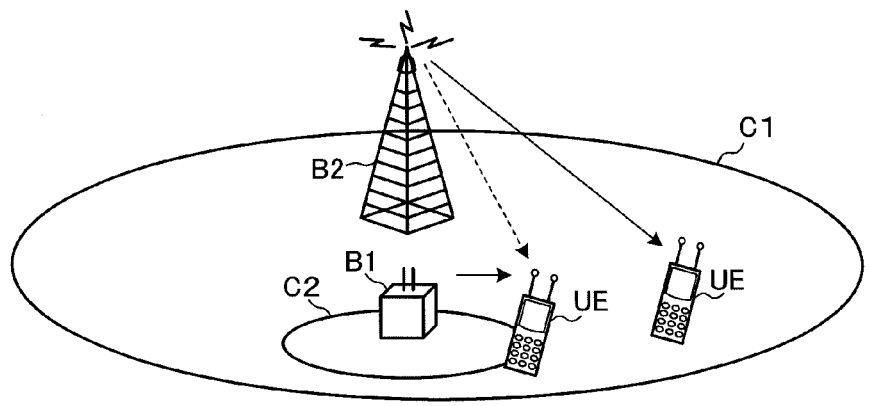
FIG.2
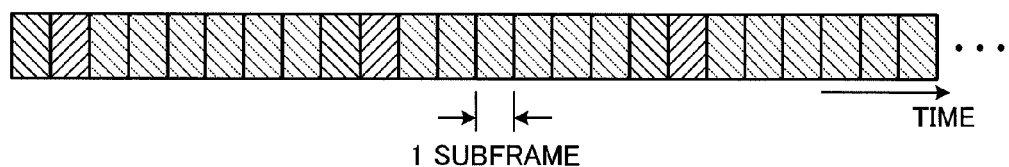

MEASUREMENT RESOURCE 1

MEASUREMENT RESOURCE 2

MEASUREMENT RESOURCE 1

MEASUREMENT RESOURCE 2

PDSCH TO CRS PATTERN

0 : ABS
1 : NORMAL SUBFRAME

UE#A

UE#B

MEASUREMENT RESOURCE 1

MEASUREMENT RESOURCE 2

PDSCH TO CRS PATTERN

0 : ABS
1 : NORMAL SUBFRAME

RADIO COMMUNICATION SYSTEM, BASE STATION APPARATUS, TERMINAL APPARATUS AND RADIO COMMUNICATION CONTROL METHOD

TECHNICAL FIELD

The present invention relates to a radio communication system, a base station apparatus, a mobile terminal apparatus and a communication control method. More particularly, the present invention relates to a radio communication system, a base station apparatus, a terminal apparatus and a radio communication control method to reduce interference between mobile terminal apparatuses by interference coordination.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. In relationship to this UMTS network, long-term evolution (LTE) has been agreed upon for the purposes of further increasing high-speed data rates, providing low delay and so on (non-patent literature 1). In LTE, as a multiplexing scheme, OFDMA (Orthogonal Frequency Division Multiple Access), which is different from W-CDMA, is applied to downlink channels (downlink).

In a third-generation system, it is possible to achieve a transmission rate of maximum approximately 2 Mbps on the downlink by using a fixed band of approximately 5 MHz. In an LTE system, it is possible to achieve a transmission rate of about maximum 300 Mbps on the downlink and about 75 Mbps on the uplink by using a variable band which ranges from 1.4 MHz to 20 MHz. Furthermore, in the UMTS network, successor systems of LTE are under study as well (for example, LTE-Advanced (LTE-A)), for the purpose of achieving further broadbandization and higher speed.

CITATION LIST

Non-Patent Literature

Non-Patent Literature 1: 3GPP, TR25.912 (V7.1.0), "Feasibility Study for Evolved UTRA and UTRAN," September 2006

SUMMARY OF THE INVENTION

Technical Problem

In Release 10 LTE, which is one type of LTE-A that has been agreed upon, a heterogeneous network (HetNet) configuration to place significance on the local area environment, in addition to the conventional cellular environment, is employed. In a layered network like a HetNet, a base station apparatus (macro base station) of a macro cell covering a relatively wide area sets the downlink transmit power greater than a base station apparatus of a small cell covering a relatively narrow area (referred to as a pico base station, a femto base station, an RRH base station and so on). To reduce interference from a macro base station having such large transmit power against pico base stations, interference coordination techniques are under study.

As one kind of such interference coordination techniques, in LTE, an MBSFN (Multimedia Broadcast multicast service Single Frequency Network) subframe is defined. An MBSFN subframe refers to a subframe where a period which is blank (in which there is no transmission) except for control channels can be provided. As a time-domain interference coordination technique in a HetNet configuration, study is in progress to provide subframes (ABSs: Almost Blank Subframes) that serve as non-transmit power periods, in radio frames transmitted from a macro base station, by utilizing MBSFN subframes, and allocate the radio resources of the ABS periods to mobile station apparatuses (mobile stations) located near the cell edges of small cells. By allocating the radio resources of ABS periods to mobile stations located near the cell edges of small cells, these mobile stations are able to connect with the small cell base stations in a situation where the influence of the transmit power from the macro base station is reduced in the ABS periods.

In Release 11 LTE, which is one type of LTE-A that is presently under discussion, study is in progress to utilize ABSs, which are subframes set to have no transmit power, by allocating part of the transmit power to the ABSs. An ABS such as this where a PDSCH with reduced transmit power is allocated may be referred to as a non-zero transmit power ABS. By utilizing such non-zero transmit power ABSs, it is expected to maintain reduced interference in a layered network like a HetNet and still improve the overall system throughput performance.

The present invention has been made in view of the above, and it is therefore an object of the present invention to provide a radio communication system, a base station apparatus, a terminal apparatus and a radio communication control method that can maintain reduced interference in a layered network like a HetNet and still improve the overall system throughput performance.

Solution to Problem

The radio communication system according to the present invention is a radio communication to include a radio base station and a terminal apparatus that connects with the radio base station, and, in this radio communication system: the radio base station has: a pattern determining section that determines a power ratio pattern showing a power ratio between a reference signal and a shared data channel signal in each subframe; and a transmission section that transmits a downlink signal including identification information for identifying the power ratio of each subframe in accordance with the determined power ratio pattern; and the terminal apparatus has: a receiving section that receives the downlink signal including the identification information from the radio base station; and a power ratio determining section that determines a power ratio between a reference signal and a shared data channel in a subframe in accordance with the identification information included in the received downlink signal.

The radio base station according to the present invention has: a pattern determining section that determines a power ratio pattern showing a power ratio between a reference signal and a shared data channel signal in each subframe; and a transmission section that transmits a downlink control signal including identification information for identifying the power ratio of each subframe in accordance with the determined power ratio pattern.

The terminal apparatus according to the present invention has: a receiving section that receives a downlink signal including identification information for identifying a power ratio between a reference signal and a shared data channel signal in each subframe; and a power ratio determining section that determines a power ratio between a reference signal and a shared data channel in a subframe in accordance with the identification information included in the received downlink signal.

The radio communication control method according to the present invention is a radio communication control method for controlling radio communication between a radio base station and a terminal apparatus, and radio communication method includes the steps of: determining a power ratio pattern showing a power ratio between a reference signal and a shared data channel signal in each subframe; and transmitting, from the radio base station to the terminal apparatus, a downlink signal including identification information for identifying the power ratio of each subframe in accordance with the determined power ratio pattern; and at the terminal apparatus, receiving the downlink signal including the identification information from the radio base station; and determining a power ratio between a reference signal and a shared data channel in a subframe in accordance with the identification information included in the received downlink signal.

Technical Advantage of the Invention

According to the present invention, it is possible to maintain reduced interference in a layered network like a HetNet and still improve the overall system throughput performance.

BRIEF DESCRIPTION OF THE DRAWINGS

FIG. 2 is a diagram to explain an overview of a heterogeneous network;

FIG. 3 is a diagram to explain the types of subframes constituting an LTE-A (Release 10 LTE) radio frame;

DESCRIPTION OF EMBODIMENTS

The radio communication system, radio base station, terminal apparatus and radio communication control method according to the present invention are applicable to LTE/LTE-A systems, which are each one type of a next-generation radio communication system. First, an overview of the LTE/LTE-A systems will be described.

Figure 1:
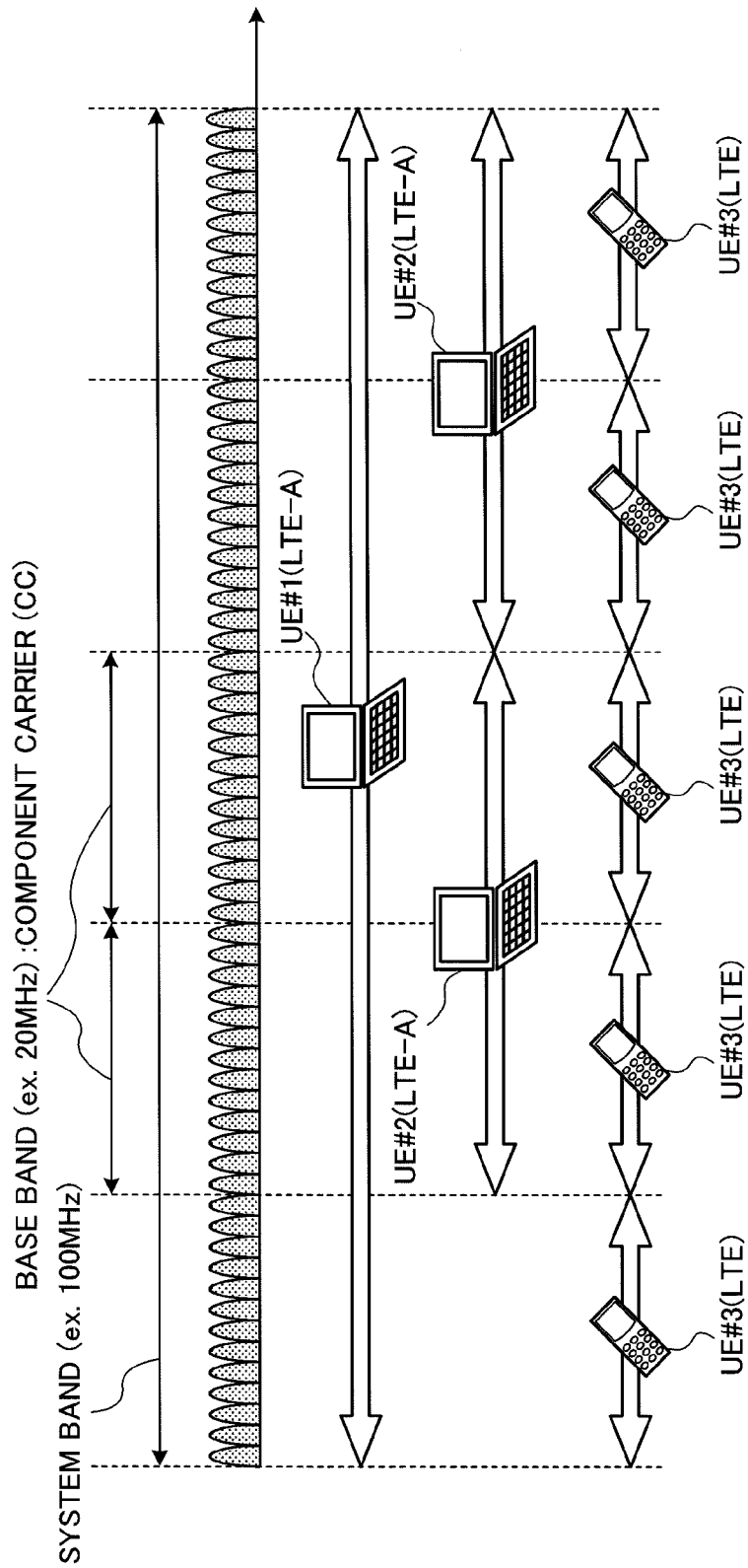
FIG. 1 is a diagram to explain a system band of an LTE/LTE-A system.

FIG. 1 is a diagram for explaining the state of use of frequency when mobile communication is carried out on the downlink. In the following description, fundamental frequency blocks will be described as component carriers. The example of FIG. 1 shows the state of use of frequency when an LTE-A system having relatively wide system band formed with a plurality of component carriers, and an LTE system having a relatively narrow system band (here, one that is formed with one component carrier), coexist.

In the LTE-A system, for example, radio communication is carried out using a variable system bandwidth of 100 MHz or below, and, in the LTE system, for example, radio communication is carried out using a variable system bandwidth of 20 MHz or below. The system band of the LTE-A system is at least one fundamental frequency region (component carrier: CC), where the system band of the LTE system is one unit. Coupling a plurality of fundamental frequency regions into a wide band as one in this way is referred to as "carrier aggregation."

For example, in FIG. 1, the system band of the LTE-A system is a system band to include bands of five component carriers (20 MHz×5=100 MHz), where the system band of the LTE system (base band: 20 MHz) is one component carrier. In FIG. 1, mobile terminal apparatus UE (User Equipment) #1 is a mobile terminal apparatus to support the LTE-A system (and also supporting the LTE system), and has a 100-MHz system band, UE #2 is a mobile terminal apparatus to support the LTE-A system (and also supporting the LTE system), and has a 40-MHz (20 MHz×2=40 MHz) system band, and UE #3 is a mobile terminal apparatus to support the LTE system (yet not supporting the LTE-A system), and has a 20-MHz (baseband) system band.

FIG. 2 shows an overview of a HetNet. As shown in FIG. 2, a HetNet is a layered network in which, in addition to an existing macro cell C1 (large cell), cells of various formats such as a pico cell C2, a femto cell and so on (small cells) are overlaid. In this HetNet, the radio base station apparatus (hereinafter referred to as "base station" or "macro base station") B2 of the macro cell C1 covering a relatively wide area is configured to have greater downlink transmit power than the radio base station apparatus (hereinafter referred to as "base station" or "pico base station") B1 of the pico cell C2 covering a relatively narrow area.

In a layered network like a HetNet, a mobile terminal apparatus (hereinafter referred to as "UE" or "mobile station") located at the cell edge of the pico cell C2 is unable to connect with the pico cell C2 despite the fact that it is located close to the pico base station B1. At the cell edge of the pico cell C2, the transmit power of the macro base station B2 is greater than the transmit power of the pico base station B1. As a result of this, the UE located at the cell edge of the pico cell C2 is unable to catch the radio frames from the pico base station B1 of the pico cell C1, and connects with the macro cell C1 by catching the radio frames from the macro base station B2 having greater transmit power. This means that the area originally belonging to the pico cell C2 is invaded by the macro base station B2 and becomes smaller.

As an interference coordination technique for reducing the interference from a macro base station against a pico base station, use of MBSFN subframes, which are provided for in LTE specifications, may be possible. To be more specific, as a time domain interference coordination technique in a HetNet configuration, study is in progress to provide subframes (ABSs) that serve as non-transmit power periods in radio frames transmitted from a macro base station, and allocate the radio resources of the ABS periods to mobile station apparatuses (mobile stations) located near the cell edges of pico cells, by utilizing MBSFN subframes. As noted above, by allocating the radio resources of ABS periods to a UE located near the cell edge of a pico cell, this UE is able to connect with the pico cell without being influenced by the transmit power from the macro base station in the ABS periods.

FIG. 3 is a diagram to explain the types of subframes constituting LTE-A (Release 10 LTE) radio frames. In LTE-A (Release 10 LTE), when ABSs are applied, a radio frame can be formed with the three types of subframes shown in FIG. 3. To be more specific, a radio frame is formed with (1) subframes that are configured as normal subframes semi-statically, (2) subframes that are configured as ABSs semi-statically, and (3) subframes that are configured as normal subframes or ABSs on a dynamically switched basis.

In the radio frame shown in FIG. 3, normal subframes and ABSs are set every nine subframes, and in subframes other than these normal subframes and ABSs, normal subframes or ABSs are set (see FIG. 5). That is, subframes other than (1) normal subframes and (2) ABSs are configured as normal subframes or ABSs on a dynamically switched basis.

Upon receiving a radio frame like this, a UE has to measure the received quality of each subframe, and feed back information about the measured channel quality to the base station. To realize feedback of adequate channel quality information in normal subframes and ABSs, measurement resources 1 and 2, which specify the subframes in which received quality has to be measured, are reported from the base station to the UE. The measurement resource 1 is a bitmap to specify the subframe positions of normal subframes for measuring received quality, and the measurement resource 2 is a bitmap to specify the subframe positions of ABSs for measuring received quality. These measurement resources are reported to the UE in higher control signals (for example, through higher layer signaling).

Figure 4A:
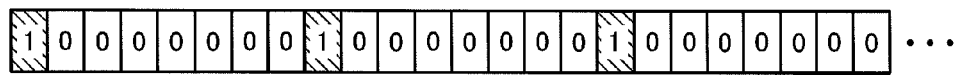
FIG. 4 provides diagrams to explain measurement resources that are reported from a radio base station apparatus.
Figure 4B:
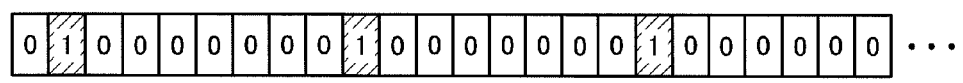

FIG. 4 provides diagrams to explain the measurement resources reported from the base station. FIG. 4A shows the measurement resource 1 to be reported from the base station, and FIG. 4B shows the measurement resource 2 to be transmitted from the base station. As shown in FIGS. 4A and 4B, the measurement resources are formed with bitmaps in which "1" is set in association with subframe positions where received quality is measured, and in which "0" is set in the rest of the subframe positions.

In the measurement resource 1, as shown in FIG. 4A, "1" is set in specific normal subframes where received quality is measured, and "0" is set in the other subframe positions. Similarly, in the measurement resource 2, as shown in FIG. 4B, "1" is set in specific ABSs where received quality is measured, and "0" is set in the other subframe positions. A mobile station measures received quality in specific normal subframes specified in the measurement resource 1. Also, the mobile station measures received quality in specific ABSs specified in the measurement resource 2.

Figure 5A:
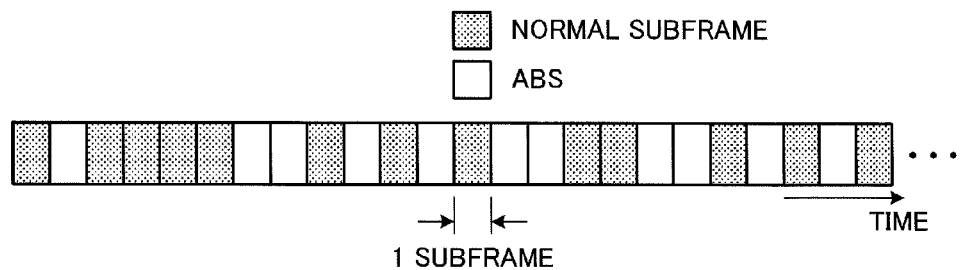
FIG. 5 provides diagrams to explain examples of radio frames where measurement of received quality is commanded by the measurement resources shown in FIGS. 4A and 4B.
Figure 5B:
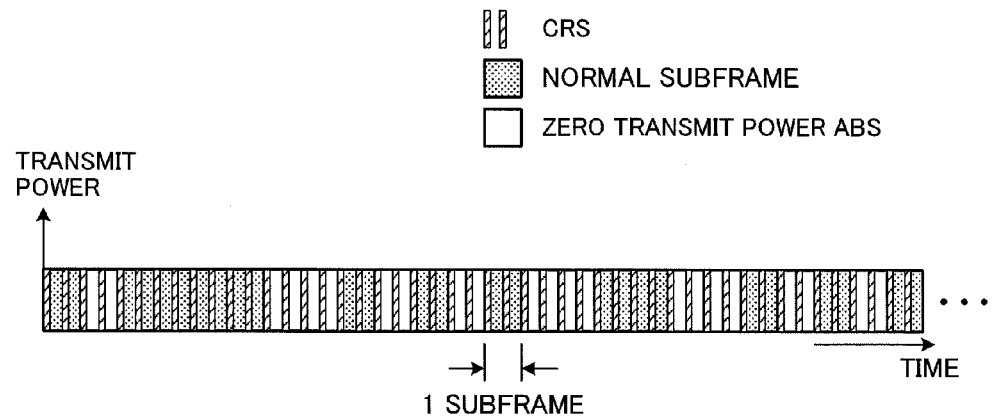

FIG. 5 shows examples of radio frames in which measurement of received quality is commanded in the measurement resources shown in FIGS. 4A and 4B. Note that, in FIG. 5B, the horizontal axis represents time, and the vertical axis represents transmit power. Also, in FIG. 5A, reference signals that are transmitted in each subframe (cell-specific reference signals (CRSs)) are not shown, and, in FIG. 5B, these reference signals (CRSs) are shown added in the radio frame shown in FIG. 5A.

In the radio frame shown in FIG. 5A, the subframes where measurement of received quality is commanded in the measurement resource 1 shown in FIG. 4A (for example, the first, ninth and seventeenth subframes from the leftmost end in FIG. 5) are allocated normal subframes. The subframes where measurement of received quality is commanded in the measurement resource 2 shown in FIG. 4B (for example, the second, tenth and eighteenth subframes from the leftmost end in FIG. 5) are allocated ABSs. Note that FIG. 5 shows a case where normal subframes or ABSs are selected as appropriate in the subframes where normal subframes or ABSs are set on a dynamically switched basis (for example, the third to eighth, the eleventh to sixteenth, and the nineteenth to twenty-fourth subframes from the leftmost end in FIG. 5).

As shown in FIG. 5B, the transmit power of CRSs that are transmitted in each subframe is set at the same level as the transmit power of normal subframes (to be more specific, the transmit power of the PDSCH (Physical Downlink Shared Channel) allocated in normal subframes), even in subframes where ABSs are allocated. This is because a UE has to measure the reference signal received power (RSRP) for handover and so on, even in subframes where ABSs are allocated.

In LTE-A (Release 10 LTE), the PDSCH is allocated only in normal subframes and is not allocated in ABSs. Consequently, a UE is required to demodulate the PDSCH only in normal subframes. To demodulate the PDSCH, it is necessary to know the ratio of the transmit power of the PDSCH to the transmit power of CRSs (hereinafter referred to as "CRS/PDSCH power ratio"). This CRS/PDSCH power ratio is reported through higher layer signaling, and allows adequate demodulation of the PDSCH.

In LTE-A (Release 11 LTE), study is in progress to tolerate allocating lower transmit power than that of normal subframes to subframes (ABSs) that are set as non-transmit power periods in LTE, and arrange a PDSCH with reduced transmit power. Subframes like this, in which a PDSCH with reduced transmit power is arranged in ABSs, may be referred to as non-zero transmit power ABSs (hereinafter referred to as "non-zero power ABSs"). In LTE-A (Release 11 LTE), the PDSCH is transmitted not only in normal subframes and transmitted in ABSs as well.

Figure 6:
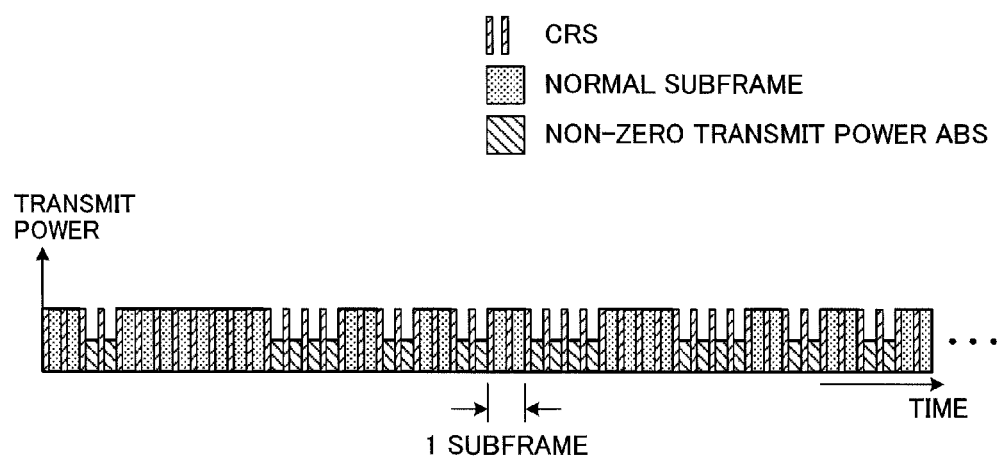
FIG. 6 is a diagram to explain a radio frame where the ABSs in the radio frame shown in FIG. 5B are replaced with non-zero power ABSs.

FIG. 6 is a diagram to explain a radio frame where the ABSs in the radio frame shown in FIG. 5B are replaced with non-zero power ABSs. In the radio frame shown in FIG. 6, the subframes where measurement of received quality is commanded in the measurement resource 2 shown in FIG. 4B (for example, the second, tenth and eighteenth subframes from the leftmost end in FIG. 5) are allocated non-zero power ABSs.

As shown in FIG. 6, non-zero power ABSs are allocated a certain level of transmit power and used to transmit the PDSCH. Consequently, in LTE-A (Release 11 LTE), it is necessary to demodulate the PDSCH not only in normal subframes, but also in non-zero power ABSs as well. Although the power ratio of normal subframe to CRSs has been defined in LTE (Release 8 LTE), presently the need to define new power ratios with respect to non-zero power ABSs has arisen.

The present inventors have arrived at the present invention by focusing on the point that, in LTE-A (Release 11 LTE), the CRS/PDSCH power ratio of non-zero power ABSs has to be known anew on the UE side upon demodulation of the PDSCH. A gist of the present invention is to determine a power ratio pattern that shows the CRS/PDSCH power ratio in each subframe, transmit a downlink signal including identification information for identifying the power ratio in each subframe in accordance with that power ratio pattern from a base station to a UE, and determine the CRS/PDSCH power ratios in subframes in accordance with the identification information included in the downlink signal received in the UE.

According to the present invention, identification information for identifying a power ratio pattern to show the CRS/PDSCH power ratios is transmitted to a UE, so that the UE is able to know the CRS/PDSCH power ratio in each subframe, and therefore is able to, in LTE-A (Release 11 LTE), adequately demodulate the PDSCH that is transmitted in normal subframes and in non-zero power ABSs and that has two kinds of transmit power. As a result of this, data communication can be carried out using the PDSCH allocated in non-zero power ABSs, so that it becomes possible to maintain reduced interference in a layered network like a HetNet and also improve the overall system throughput performance.

With the first example of the present invention, in addition to the above-described signaling of the measurement resources 1 and 2, identification information for identifying two kinds of CRS/PDSCH power ratio patterns, required to demodulate the PDSCH (hereinafter referred to as "CRS/PDSCH power ratio patterns" or "power ratio patterns" whenever appropriate), are signaled on a bitmap basis. As identification information for identifying the CRS/PDSCH power ratios, it may be possible to transmit higher control signals (for example, through higher layer signaling such as RRC signaling) to the UE side, on a per UE basis. Note that although a case will be described below where bitmaps of two kinds of power ratio patterns are transmitted, examples to transmit bitmaps of three or more kinds of power ratio patterns are also possible.

Figure 7A:
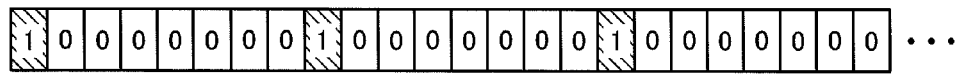
FIG. 7 provides diagrams to explain CRS/PDSCH power ratio patterns according to a first example of the present invention.
Figure 7B:
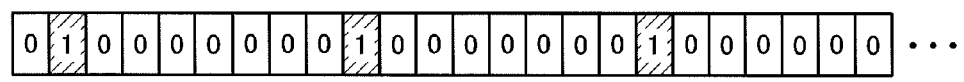
Figure 7C:

FIG. 7 provides diagrams to explain the CRS/PDSCH power ratio patterns according to a first example of the present invention. FIG. 7A shows a bitmap of the measurement resource 1 to be reported from the base station, and FIG. 7B shows a bitmap of the measurement resource 2 to be transmitted from the base station. FIG. 7C shows a pattern of two kinds of CRS/PDSCH power ratios required upon demodulation of the PDSCH in LTE-A (Release 11 LTE). This power ratio pattern is determined based on the measurement resources 1 and 2 shown in FIGS. 7A and 7B.

As shown in FIG. 7A, in the measurement resource 1, "1" is set in specific normal subframe positions where quality should be measured, and "0" is set in the other subframe positions. In the measurement resource 2, as shown in FIG. 7B, "1" is set in specific non-zero power ABS positions where quality should be measured, and "0" is set in the other subframe positions.

In the power ratio pattern shown in FIG. 7C, "1" to represent a first CRS/PDSCH power ratio for normal subframes is set in bit information corresponding to the subframes where measurement of received quality is commanded in the measurement resource 1 shown in FIG. 7A (for example, the first, ninth and seventeenth bit information from the leftmost end in FIG. 7). Also, "0" to represent a second CRS/PDSCH power ratio for non-zero power ABSs is set in bit information corresponding to the subframes where measurement of received quality is commanded in the measurement resource 2 shown in FIG. 7B (for example, the second, tenth and eighteenth bit information from the leftmost end in FIG. 7).

Note that FIG. 7C shows a case where normal subframes or non-zero power ABSs are selected as appropriate in bit information corresponding to subframes where normal subframes or non-zero power ABSs are set on a dynamically switched basis (for example, the third to eighth, the eleventh to sixteenth, and the nineteenth to twenty-fourth bit information from the leftmost end in FIG. 7).

The first CRS/PDSCH power ratio for normal subframes and the second CRS/PDSCH power ratio for non-zero power ABSs are reported through higher layer signaling described above, so as to be known in advance between base stations (macro base station and pico base station) and UEs. When transmitting the bitmap of the power ratio pattern shown in FIG. 7C, these first and second CRS/PDSCH power ratios are transmitted separately. It is equally possible make these patterns common and report it in a broadcast channel.

With the first example of the present invention, since bitmaps of two kinds of CRS/PDSCH power ratio patterns, required upon demodulation of the PDSCH, are transmitted to a UE as identification information for identifying the power ratio patterns, the UE is able to determine the CRS/PDSCH power ratio in each subframe, and therefore is able to, in LTE-A (Release 11 LTE), adequately demodulate the PDSCH that is transmitted in normal subframes and in non-zero power ABSs and that has two kinds of transmit power. As a result of this, data communication can be carried out using the PDSCH allocated in non-zero power ABSs, so that it becomes possible to maintain reduced interference in a layered network like a HetNet and also improve the overall system throughput performance.

Figure 8A:
FIG. 8 provides diagrams to explain CRS/PDSCH power ratio patterns set in a plurality of UEs (UE #A and UE #B) in the first example.

With the first example, the CRS/PDSCH power ratio pattern shown in FIG. 7C can be determined on a per UE basis. Basically, what portion of a radio frame is allocated ABSs is determined in accordance with the situation of pico base stations (mainly the number of users) which a macro base station interferes with. The characteristic in this case lies in that, while whether normal subframes or ABSs are applied is subject to dynamic control, UEs are subject to semi-static control. UEs to be subject to resource allocation are roughly divided in half, and, after which one is used is determined in subframes where dynamic control is desirable, the UEs to allocate radio resources to are selected. For example, the macro base station determines what portion of resources are to be made ABSs, based on control signals from neighboring macro and pico base stations. To realize dynamic switching, the patterns are determined such that the UEs to assume normal subframes and ABSs become approximately equal. At this time, the CRS/PDSCH power ratio patterns may be set in accordance with the channel quality information that is fed back from each UE and buffer information that is buffered for transmission to each UE. FIG. 8 provides diagrams to explain CRS/PDSCH power ratio patterns set in a plurality of UEs (UE #A and UE #B) in the first example. FIG. 8A shows a CRS/PDSCH power ratio pattern set in UE #A, and FIG. 8B shows a CRS/PDSCH power ratio pattern set in UE #B.

Figure 8B:
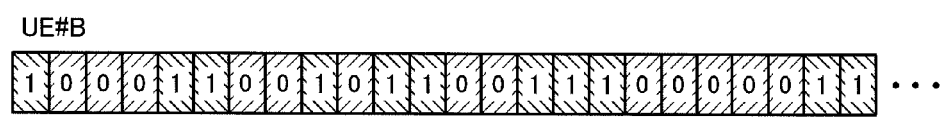

With the power ratio patterns shown in FIGS. 8A and 8B, a case is shown where normal subframes or non-zero power ABSs are selected as appropriate in bit information corresponding to subframes where normal subframes or non-zero power ABSs are set on a dynamically switched basis (for example, the third to eighth, the eleventh to sixteenth, and the nineteenth to twenty-fourth bit information from the leftmost end in FIGS. 8A and 8B).

In particular, with the power ratio patterns shown in FIGS. 8A and 8B, a case is shown where different power ratio patterns are set between UE #A and UE #B. For example, in the third and fourth subframes from the leftmost end in FIGS. 8A and 8B, normal subframes ("1") are set for UE #A, whereas non-zero power ABSs ("0") are set for UE #B. In the fifth and sixth subframes from the leftmost end in FIGS. 8A and 8B, non-zero power ABSs ("0") are set for UE #A, whereas normal subframes ("1") are set for UE #B.

Figure 9A:
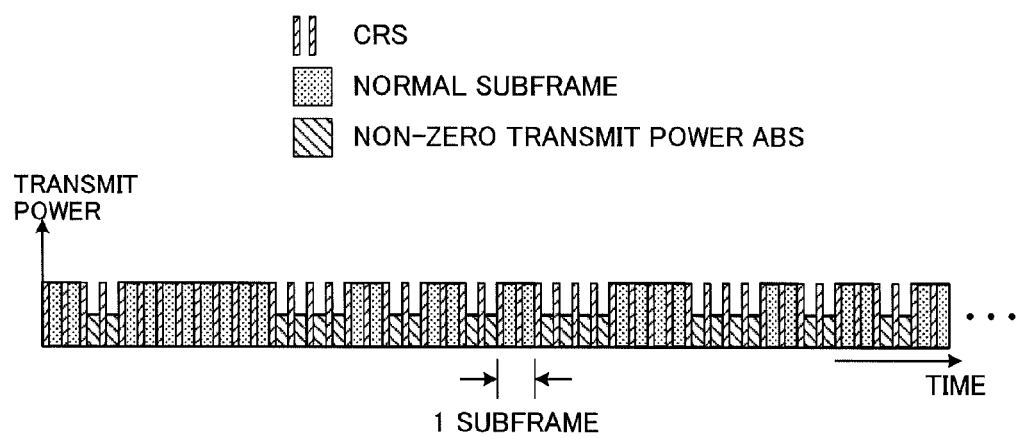
FIG. 9 provides diagrams to explain user assignment to radio frames when the power ratio patterns shown in FIGS. 8A and 8B are set.
Figure 9B:

User (UE) assignment to radio frames in the event the power ratio patterns shown in FIGS. 8A and 8B are determined with respect to UEs #A and #B will be described with reference to FIG. 9. FIG. 9 provides diagrams to explain user assignment to radio frames in the event the power ratio patterns shown in FIGS. 8A and 8B are determined with respect to UEs #A and #B. FIG. 9A shows examples of normal subframes and non-zero power ABSs allocated in radio frames corresponding to the power ratio patterns shown in FIGS. 8A and 8B. FIG. 9B shows an example in which UEs are assigned in the radio frame shown in FIG. 9A.

As shown in FIG. 9A, assume that normal subframes and non-zero power ABSs are allocated instantaneously in subframe units. For example, the base station allocates normal subframes or non-zero power ABSs to the radio frame in subframe units, taking into account interference of other cells.

To be more specific, in the radio frame shown in FIG. 9A, normal subframes are set in subframes that are configured semi-statically (the first, ninth and seventeenth subframes from the leftmost end in FIG. 9A), and also ABSs are set in subframes that are configured semi-statically (the second, tenth and eighteenth subframes from the leftmost end in FIG. 9A). In subframes that are configured on a dynamically switched basis (the third to eighth, the eleventh to sixteenth and the nineteenth to twenty-fourth subframes from the leftmost end in FIG. 9A), normal subframes are set in the third to sixth, eleventh, thirteenth, sixteenth, twentieth, twenty-second and twenty-fourth subframes from the leftmost end, and non-zero power ABSs are set in the seventh, eighth, twelfth, fourteenth, fifteenth, nineteenth, twenty-first, and twenty-third subframes.

In this way, when users are assigned to a radio frame where the types of subframes are scheduled, the base station first determines between normal subframes and ABSs. After that, using these subframes as fixed normal subframes (or ABSs), UEs that are capable of demodulation are picked up, and proportional fair scheduling is applied. Although a case will be described here where user assignment is carried out using proportional fair scheduling, it is equally possible to change and apply the scheduling method to use in user assignment as appropriate.

As shown in FIG. 8, in subframes that are configured semi-statically (the first, ninth and seventeenth subframes from the leftmost end shown in FIG. 8, and the second, tenth and eighteenth subframes from the leftmost end shown in FIG. 8), common subframe types are applied between UE #A and UE #B, so that user assignment is carried out such that normal subframes and non-zero power ABSs are allocated evenly between UE #A and UE #B.

FIG. 9B shows a case where UE #B, UE #A and UE #A are assigned in the first, ninth and seventeenth subframes (normal subframes) from the leftmost end, respectively. Also, a case is shown where UE #B, UE #B, and UE #A are assigned in the second, tenth and eighteenth subframes (non-zero power ABSs) from the leftmost end, respectively.

In subframes that are configured on a dynamically switched basis (the third to eighth, the eleventh to sixteenth, and the nineteenth to twenty-fourth subframes from the leftmost end in FIG. 9A), UEs with which the same types of subframes as the scheduled subframe types (normal subframes or non-zero power ABSs) in the radio frame are set in the power ratio pattern, are assigned.

When the types of subframes are scheduled as in the radio frame shown in FIG. 9A, given that normal subframes are set in the third to sixth subframes from the leftmost end, the UEs with which normal subframes are set in the corresponding subframe positions in the power ratio pattern shown in FIG. 8 are selected. User assignment is carried out such that, as shown in FIG. 9B, UE #A is selected in the third and fourth subframes from the leftmost end, and UE #B is selected in the fifth and sixth subframes from the leftmost end.

In the radio frame shown in FIG. 9A, given that non-zero power ABSs are set in the seventh and eighth subframes from the leftmost end, the UEs with which non-zero power ABSs are set in the corresponding subframes in the power ratio pattern shown in FIG. 8 are selected. User assignment is carried out such that, as shown in FIG. 9B, UE #B is selected in the seventh and eighth subframes from the leftmost end.

The UEs to be assigned to the eleventh to sixteenth, and the nineteenth to twenty-fourth subframes from the leftmost end shown in FIG. 9A are selected. Here, a case will be described where the UEs to be subject to user assignment are comprised of two UEs #A and #B. When the UEs to be subject to user assignment are comprised of three or more UEs, it is possible to form groups of multiple UEs, between which the same subframe types are determined in each subframe position, and assign the UEs on a per group basis. It is equally possible to form groups of UEs between which the same power ratio patterns are determined, and assign UEs on a per group basis.

With the first example of the present invention, CRS/PDSCH power ratio patterns can be determined separately between UEs, so that it is possible to improve the flexibility upon assignment of UEs to subframes in the base station. Since UEs having good channel states can be assigned preferentially in each subframe, it is possible to improve the overall system throughput performance.

With a second example of the present invention, two kinds of CRS/PDSCH power ratios required to demodulate the PDSCH, or their types, are transmitted to the UE side as identification information for identifying the CRS/PDSCH power ratios, using a control signal. Although the PDCCH (Physical Downlink Control Channel), which is one of downlink control signals, can be used as the control signal to transmit at least two kinds of CRS/PDSCH power ratios and so on, this is by no means limiting. Although a case will be described below where two kinds of CRS/PDSCH power ratios are transmitted, examples to transmit three or more kinds of CRS/PDSCH power ratios are equally possible.

A first method to transmit two kinds of CRS/PDSCH power ratios and so on using a downlink control signal is a method to add bit information that represents the types of two kinds of CRS/PDSCH power ratios to a downlink control signal. With the first method, for example, it is possible to add one bit (hereinafter referred to as "power ratio type bit") that represents the types of two kinds of CRS/PDSCH power ratios to the bit information constituting the DCI format included in the PDCCH. A bit that is determined in advance may be used instead. It may also be possible to assign two kinds of UE-IDs to UEs and make decisions based on which UE-ID the allocation is addressed to.

As this power ratio type bit, for example, "1" is set to report the first CRS/PDSCH power ratio type for normal subframes, and "0" is set to report the second CRS/PDSCH power ratio type for non-zero power ABSs. A UE to receive the PDCCH is able to know the type of the CRS/PDSCH power ratio in each subframe from the analysis result of the power ratio type bits in the DCI format, and therefore is able to adequately demodulate the PDSCH that is transmitted in normal subframes or in non-zero power ABSs and that has two kinds of transmit power in LTE-A (Release 11 LTE).

In the first method, the first CRS/PDSCH power ratio for normal subframes and the second CRS/PDSCH power ratio for non-zero power ABSs are reported through higher layer signaling described above, so as to be known between base stations (macro base station and pico base station) and UEs.

With the first method, it is preferable, as an embodiment, to share the power ratio type bits with other pieces of bit information included in the DCI format. In this case, it is not necessary to newly add bit information to the DCI format, which then makes it possible to transmit the types of two kinds of CRS/PDSCH power ratios with minimal system changes such as changing the definitions of the power ratio type bits.

A second method to report two kinds of CRS/PDSCH power ratios and so on using a downlink control signal is a method of assigning two UE-IDs to each UE in advance and also associating these UE-IDs with the two kinds of CRS/PDSCH power ratios. With the second method, the UE-IDs assigned to UEs may be included in the PDCCH by, for example, masking part of the bit information of the DCI included in the PDCCH.

With the second method, for example, two UE-IDs (UE-ID #1 and UE-ID #2) are assigned to one UE such that UE-ID #1 is set in the PDCCH when the first CRS/PDSCH power ratio for normal subframes is reported, and UE-ID #1 is set in the PDCCH when the second CRS/PDSCH power ratio for non-zero power ABSs is reported.

A UE to receive the PDCCH is able to know the CRS/PDSCH power ratio type in each subframe from the UE-IDs specified in the DCI format, and therefore is able to adequately demodulate the PDSCH that is transmitted in normal subframes and in non-zero power ABSs and that has two kinds of transmit power, in LTE-A (Release 11 LTE).

With the second method, the relationships between the two UE-IDs assigned to UEs and the two kinds of CRS/PDSCH power ratios can be reported to UEs by using, for example, higher control signals (for example, through RRC signaling). These relationships may be reported through higher layer signaling described above, so as to be known between base stations (macro base station and pico base station) and UEs. In this case, it is not necessary to communicate the relationships between UE-IDs and CRS/PDSCH power ratios separately, so that it becomes possible to reduce the volume of communication and still transmit the types of two kinds of CRS/PDSCH power ratios to UEs.

With the above-described first and second methods, the types of power ratios are transmitted using a control signal, and the first and second CRS/PDSCH power ratios themselves (the numerical values of the power ratios) are reported through higher layer signaling described above, so as to be known between base stations (macro base station and pico base station) and UEs in advance. A third method of reporting two kinds of CRS/PDSCH power ratios and so on using a control signal is a method of setting the two kinds of CRS/PDSCH power ratios themselves in a control signal. With the third method, for example, a bit field where the CRS/PDSCH power ratios can be set is provided in the DCI format included in the PDCCH (hereinafter referred to as "power ratio setting field").

In this power ratio setting field, for example, bit information for specifying the first CRS/PDSCH power ratio for normal subframe is set, and bit information for specifying the second CRS/PDSCH power ratio for non-zero power ABSs is set. A UE to receive the PDCCH is able to determine the CRS/PDSCH power ratio in each subframe from the analysis result of the bit information in the power ratio setting field in the DCI format, and therefore is able to adequately demodulate the PDSCH that is transmitted in normal subframes and in non-zero power ABSs and that has two kinds of transmit power, in LTE-A (Release 11 LTE).

In this way, with the second example of the present invention, two kinds of CRS/PDSCH power ratios required to demodulate the PDSCH, or their types, are reported to a UE as identification information for identifying the power ratio patterns, so that the UE is able to determine the CRS/PDSCH power ratio in each subframe, and therefore is able to, in LTE-A (Release 11 LTE), adequately demodulate the PDSCH that is transmitted in normal subframes and in non-zero power ABSs and that has two kinds of transmit power. As a result of this, data communication can be carried out using the PDSCH allocated in non-zero power ABSs, so that it becomes possible to maintain reduced interference in a layered network like a HetNet and also improve the overall system throughput performance.

With the above-described first and second examples, information about two kinds of CRS/PDSCH power ratios required to demodulate the PDSCH is transmitted to the UE side using higher control signals and using control signals, respectively. With a third example of the present invention, the CRS/PDSCH power ratios are determined from the above-described measurement resources 1 and 2, without need to transmit information about the CRS/PDSCH power ratios from the base station side.

Figure 10A:
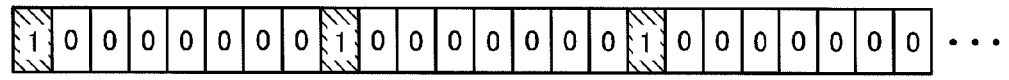
FIG. 10 provides diagrams to explain CRS/PDSCH power ratio patterns determined in a UE in a third example of the present invention.
Figure 10B:
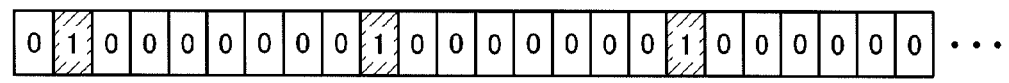
Figure 10C:
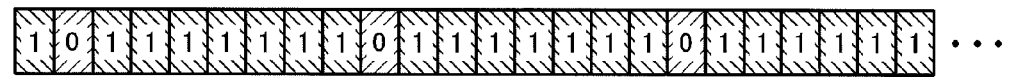

FIG. 10 provides diagrams to explain the CRS/PDSCH power ratio patterns determined in a UE, according to the third example of the present invention. FIG. 10A shows the measurement resource 1 to be reported from the base station, and FIG. 10B shows the measurement resource 2 to be transmitted from the base station. FIG. 10C shows the CRS/PDSCH power ratio pattern determined in the UE.

As shown in FIG. 10A, in the measurement resource 1, "1" is set in the subframe positions of normal subframes where quality should be measured, and "0" is set in the other subframe positions. In the measurement resource 2, as shown in FIG. 10B, "1" is set in the subframe positions of non-zero power ABSs where quality should be measured, and "0" is set in the other subframe positions.

With the third example, when the measurement resources 1 and 2 are reported from the base station, the UE generates a power ratio pattern to show two kinds of CRS/PDSCH power ratios based on the measurement resource 2. To be more specific, "0" to represent the second CRS/PDSCH power ratio for non-zero power ABSs is set in subframe positions where measurement of received quality is commanded in the measurement resource 2 (for example, the second, tenth and eighteenth subframes from the leftmost end in FIG. 10C). Then, "1" to represent the first CRS/PDSCH power ratio for normal subframes is set in the other subframe positions. By this means, the UE acquires two kinds of CRS/PDSCH power ratio patterns.

With the third example of the present invention, a UE is able to determine the two kinds of CRS/PDSCH power ratio patterns required to demodulate the PDSCH based on the measurement resource 2 reported from the base station, so that the UE is able to know the CRS/PDSCH power ratio in each subframe, and therefore is able to, in LTE-A (Release 11 LTE), adequately demodulate the PDSCH that is transmitted in normal subframes and in non-zero power ABSs and that has two kinds of transmit power. As a result of this, data communication can be carried out using the PDSCH allocated in non-zero power ABSs, so that it becomes possible to maintain reduced interference in a layered network like a HetNet and also improve the overall system throughput performance.

Figure 11:
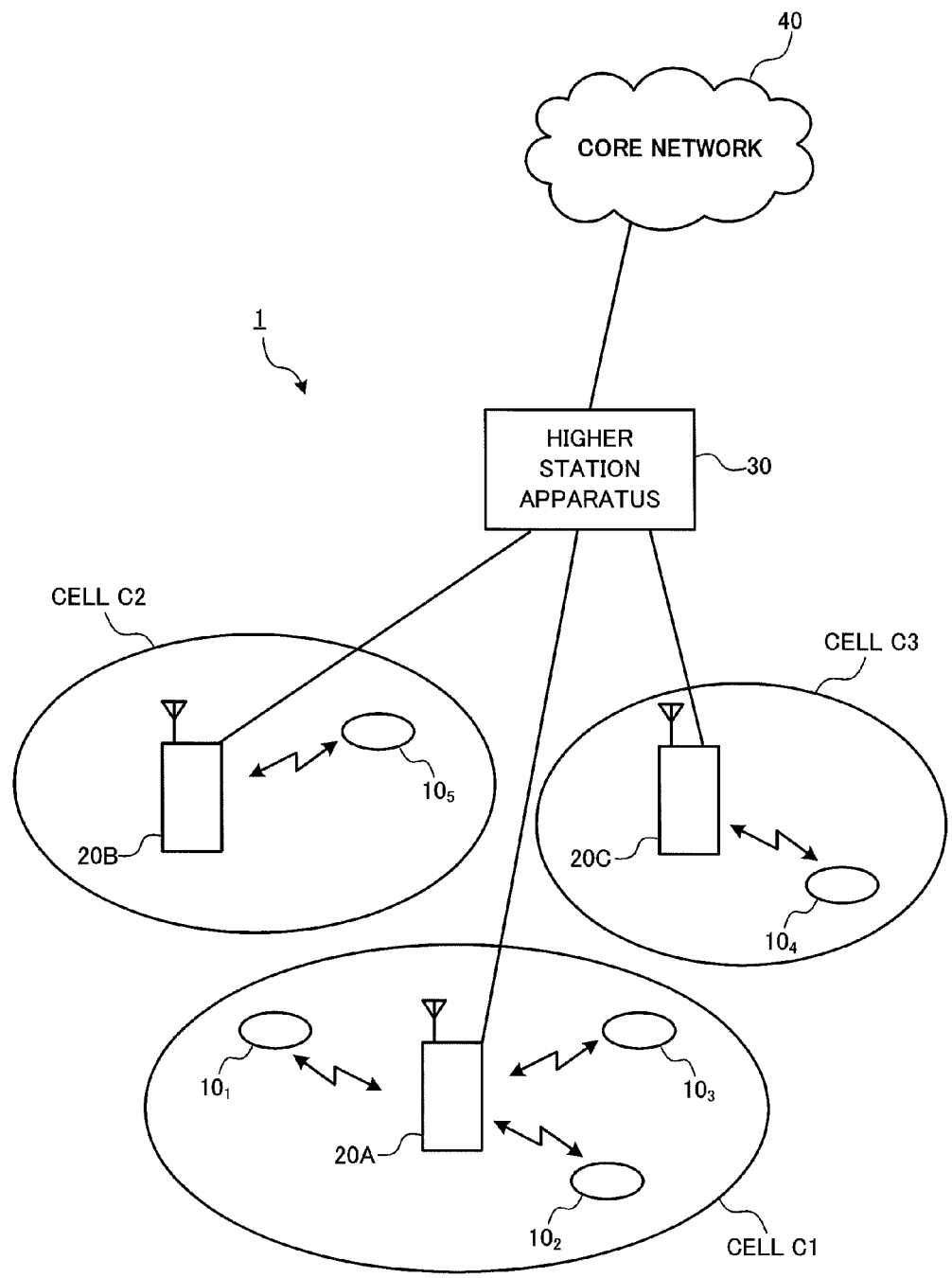
FIG. 11 is a network configuration diagram of a radio communication system.

A radio communication system according to an embodiment of the present invention will be described in detail. FIG. 11 is a diagram to explain a system configuration of a radio communication system according to the present embodiment. Note that the radio communication system shown in FIG. 11 is a system to accommodate, for example, the LTE system or SUPER 3G. In this radio communication system, carrier aggregation to group a plurality of fundamental frequency blocks into one, where the system band of the LTE system is one unit, is used. This radio communication system may be referred to as "IMT-Advanced" or may be referred to as "4G."

As shown in FIG. 11, a radio communication system 1 is configured to include base station apparatuses 20A, 20B and 20C, and a plurality of mobile terminal apparatuses 10 ($10_1$, $10_2$, $10_3$, ... $10_n$, where n is an integer to satisfy n>0) that communicate with these base station apparatuses 20A, 20B and 20C. The base station apparatuses 20A, 20B and 20C are connected with a higher station apparatus 30, and this higher station apparatus 30 is connected with a core network 40. The mobile terminal apparatuses 10 are able to communicate with the base station apparatuses 20A, 20B and 20C in cells C1, C2 and C3, respectively. Note that the higher station apparatus 30 may be, for example, an access gateway apparatus, a radio network controller (RNC), a mobility management entity (MME) and so on, but is by no means limited to these.

The radio communication system 1 according to an embodiment of the present invention is applicable to a layered network, typified by a HetNet. In a HetNet, for example, the base station apparatus 20A is a macro base station that has a wide coverage area and high transmission power, and the base station apparatus 20B is a pico base station that is arranged in the coverage area of the base station apparatus 20A, and has lower transmit power and a smaller coverage area than the macro base station.

Each mobile terminal apparatus ($10_1$, $10_2$, $10_3$, ... $10_n$) may be either an LTE terminal or an LTE-A terminal, but will be described simply as "mobile terminal apparatus 10" in the following description, unless specified otherwise. Also, although the mobile terminal apparatus 10 will be described to perform radio communication with the base station apparatuses 20A, 20B and 20C for ease of explanation, more generally, user equipment (UE) including mobile terminal apparatuses and fixed terminal apparatuses may be used as well.

In the radio communication system 1, as radio access schemes, OFDMA (Orthogonal Frequency Division Multiple Access) is applied to the downlink and SC-FDMA (Single-Carrier Frequency Division Multiple Access) is applied to the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Communication channels in the LTE system will be described. Downlink communication channels include a PDSCH, which is a downlink data channel used by each mobile terminal apparatus 10 on a shared basis, and downlink L1/L2 control channels (PDCCH, PCFICH, PHICH). Transmission data and higher control information are transmitted by the PDSCH. Scheduling information for the PDSCH and the PUSCH and so on are transmitted by means of the PDCCH. The number of OFDM symbols to use for the PDCCH is transmitted by the PCFICH (Physical Control Format Indicator Channel). HARQ ACK/NACK for the PUSCH are transmitted by the PHICH (Physical Hybrid-ARQ Indicator Channel).

Uplink communication channels include a PUSCH (Physical Uplink Shared Channel), which is an uplink data channel used by each mobile terminal apparatus on a shared basis, and a PUCCH (Physical Uplink Control Channel), which is an uplink control channel. By means of this PUSCH, transmission data and higher control information are transmitted. By the PUCCH, CSI, which is received quality information to use reference signals (CSI-RSs and CRSS), downlink radio quality information (CQI: Channel Quality Indicator), ACK/NACK, and so on are transmitted.

Figure 12:
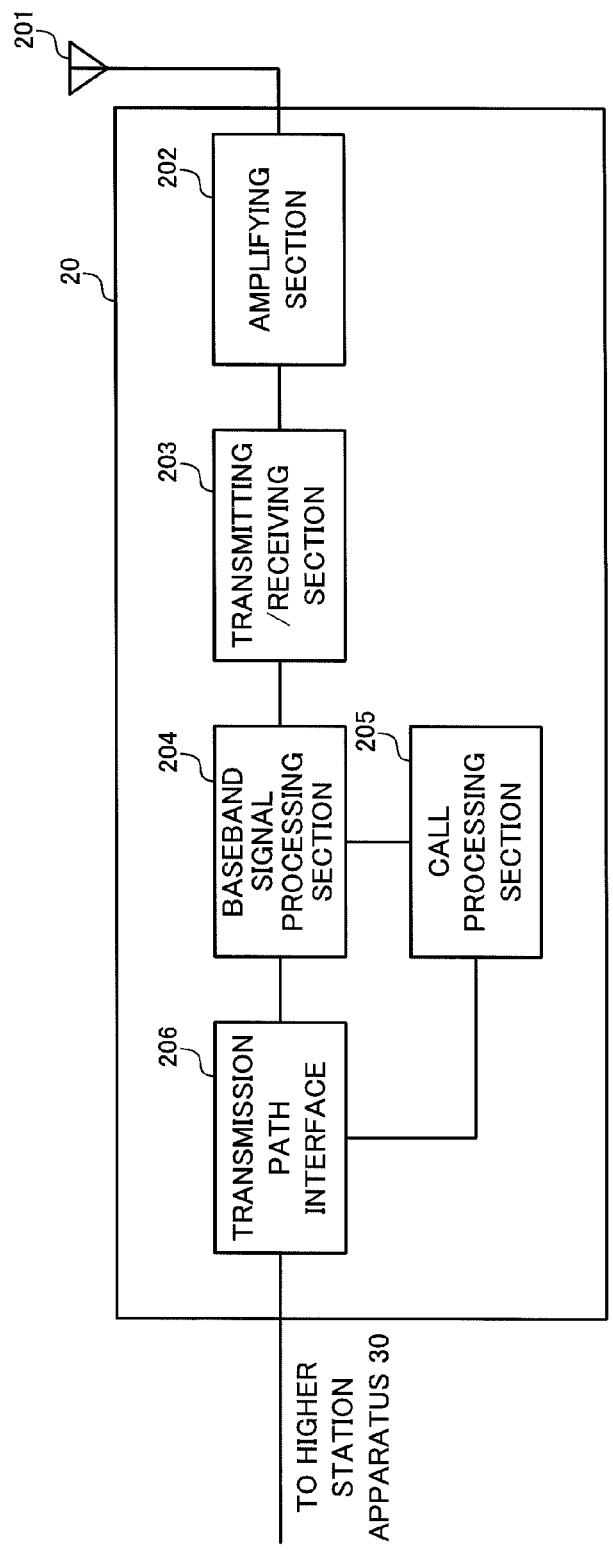
FIG. 12 is a diagram to explain an overall configuration of a base station apparatus.

An overall configuration of the base station apparatus 20 according to the present embodiment will be described with reference to FIG. 12. Note that the base station apparatus 20A (for example, a macro base station), the base station apparatus 20B (for example, a pico base station) and the base station apparatus 20C all have the same configurations and therefore will be described simply as "base station apparatus 20." The base station apparatus 20 has a transmitting/receiving antenna 201, an amplifying section 202, a transmitting/receiving section (reporting section) 203, a baseband signal processing section 204, a call processing section 205, and a transmission path interface 206. Transmission data to be transmitted from the base station apparatus 20 to the mobile terminal apparatus 10 on the downlink is input from the higher station apparatus 30 into the baseband signal processing section 204 via the transmission path interface 206.

In the baseband signal processing section 204, a signal of a downlink data channel is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, as for a signal of a physical downlink control channel, which is a downlink control channel, transmission processes such as channel coding and an inverse fast Fourier transform are performed.

The baseband signal processing section 204 reports control information for allowing each mobile terminal apparatus 10 to perform radio communication with the base station apparatus 20, to the mobile terminal apparatuses 10 connected to the same cell, by a broadcast channel. The broadcast information for communication in the cell includes, for example, the uplink or downlink system bandwidth, identification information of a root sequence (root sequence index) for generating random access preamble signals in the PRACH (Physical Random Access Channel), and so on.

In the transmitting/receiving section 203, a baseband signal that is output from the baseband signal processing section 204 is subjected to frequency conversion into a radio frequency band. The amplifying section 202 amplifies the transmission signal having been subjected to frequency conversion, and outputs the result to the transmitting/receiving antenna 201.

As for a signal to be transmitted from the mobile terminal apparatus 10 to the base station apparatus 20 on the uplink, a radio frequency signal received by the transmitting/receiving antenna 201 is amplified in the amplifying section 202, converted into a baseband signal through frequency conversion in the transmitting/receiving section 203, and input in the baseband signal processing section 204.

The baseband signal processing section 204 performs an FFT process, an IDFT process, error correction decoding, a MAC retransmission control receiving process, and RLC layer and PDCP layer receiving processes of the transmission data that is included in the baseband signal received on the uplink. The decoded signal is transferred to the higher station apparatus 30 through the transmission path interface 206.

The call processing section 205 performs call processing such as setting up and releasing communication channels, manages the state of the base station apparatus 20 and manages the radio resources.

Figure 13:
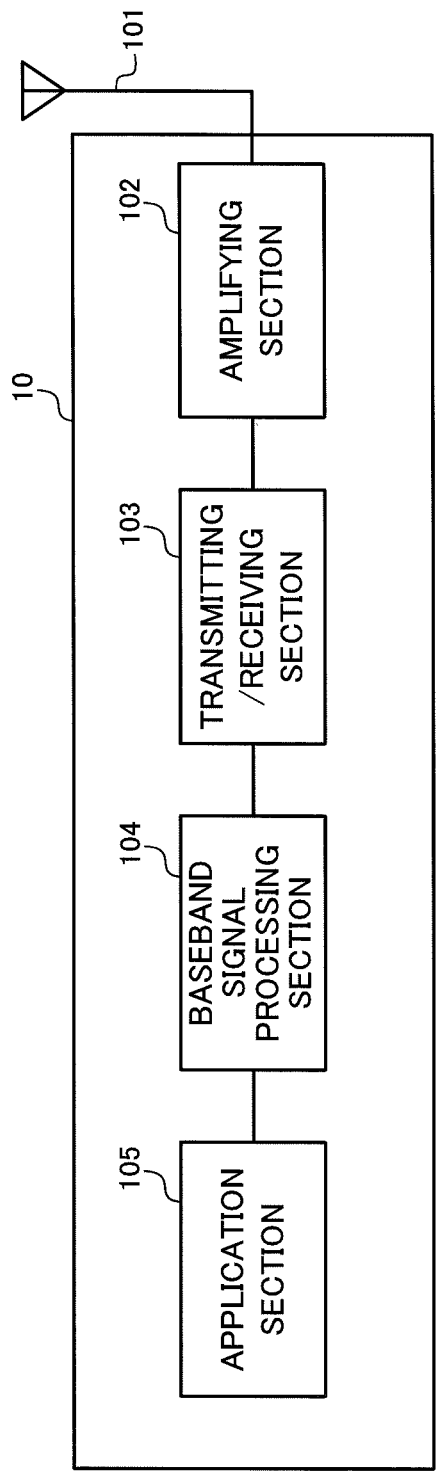
FIG. 13 is a diagram to explain an overall configuration of a mobile terminal apparatus.

An overall configuration of the mobile terminal apparatus 10 according to the present embodiment will be described with reference to FIG. 13. An LTE terminal and an LTE-A terminal have the same hardware configurations in principle parts, and therefore will be described indiscriminately. A mobile terminal apparatus 10 has a transmitting/receiving antenna 101, an amplifying section 102, a transmitting/receiving section (receiving section) 103, a baseband signal processing section 104, and an application section 105.

As for downlink data, a radio frequency signal that is received in the transmitting/receiving antenna 101 is amplified in the amplifying section 102, and converted into a baseband signal through frequency conversion in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. In the downlink data, broadcast information is also transferred to the application section 105.

Uplink transmission data is input from the application section 105 into the baseband signal processing section 104. The baseband signal processing section 104 performs a mapping process, a retransmission control (HARQ) transmission process, channel coding, a DFT process, and an IFFT process. A baseband signal that is output from the baseband signal processing section 104 is converted into a radio frequency band in the transmitting/receiving section 103, and, after that, amplified in the amplifying section 102 and transmitted from the transmitting/receiving antenna 101.

The function blocks of the baseband signal processing section 204 provided in the base station apparatus 20 will be described with reference to FIG. 14. The function blocks shown in FIG. 14 are simplified to explain the present invention, but is assumed to have configurations which a baseband signal processing section provided in a base station apparatus should normally have.

Figure 14:
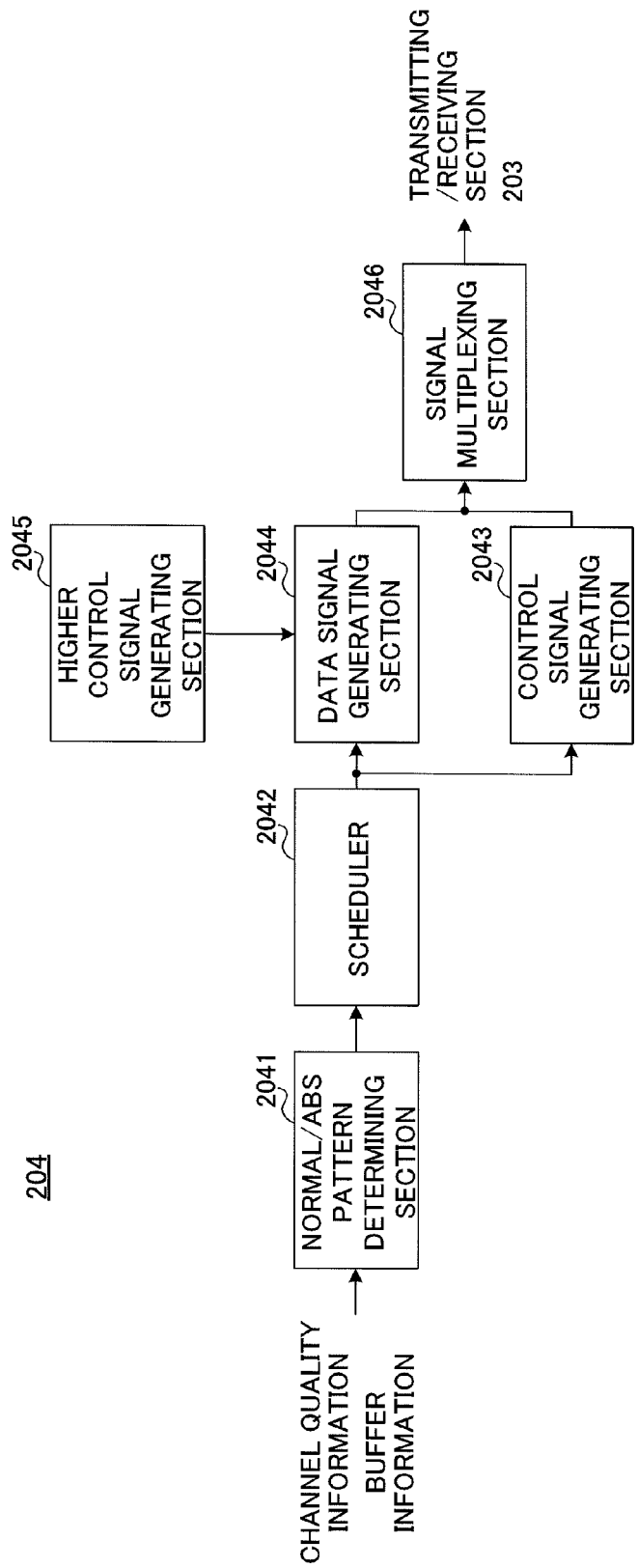
FIG. 14 is a functional block diagram of a baseband signal processing section provided in a base station apparatus.

As shown in FIG. 14, the baseband signal processing section 204 provided in the base station apparatus 20 is configured to include a normal subframe/non-zero power ABS pattern determining section (normal/ABS pattern determining section) 2041, a scheduler 2042, a control signal generating section 2043, a data signal generating section 2044, a higher control signal generating section 2045, and a signal multiplexing section 2046.

The normal/ABS pattern determining section 2041 constitutes a pattern determining section, and determines power ratio patterns that represent the CRS/PDSCH power ratio in each subframe constituting a radio frame. The normal/ABS pattern determining section 2041 executes control based on signals from neighboring cells. The normal/ABS pattern determining section 2041 determines the CRS/PDSCH power ratio patterns in accordance with, for example, channel quality information fed back from each mobile terminal apparatus 10, buffer information that is buffered to transmit to each mobile terminal apparatus 10, and so on. Note that the normal/ABS pattern determining section 2041 can be omitted when the second and third examples are applied.

The scheduler 2042 determines the allocation of the types of subframes in a radio frame (normal subframes or non-zero power ABSs), taking into account, for example, interference of other cells. Then, when the first example is applied, the scheduler 2042 assigns users in accordance with the power ratio pattern determined in the normal/ABS pattern determining section 2041. For example, the scheduler 2042 assigns users using proportional fair scheduling.

The control signal generating section 2043 generates a control signal for the mobile terminal apparatuses 10, the assignment of which to each subframe has been determined by the scheduler 2043. When the first method of the second example is applied, the control signal generating section 2043 generates a PDCCH, in which one bit (power ratio type bit) that represents two kinds of CRS/PDSCH power ratio types is added to the bit information constituting the DCI format. Also, when the second method is applied, the control signal generating section 2043 generates a PDCCH, in which UE-IDs associated with two kinds of CRS/PDSCH power ratios are set in the DCI format. Furthermore, when the third method is applied, the control signal generating section 2043 generates a PDCCH, in which a bit field (power ratio setting field) where the CRS/PDSCH power ratio can be set is provided in the DCI format.

The data signal generating section 2044 generates a data signal (PDSCH) for the mobile terminal apparatuses 10, the assignment of which to each subframe has been determined by the scheduler 2042. The data signal generated in the data signal generating section 2044 includes a higher control signal (for example, measurement resources, CRS/PDSCH power ratio patterns, and so on) generated in the higher control signal generating section 2045.

The higher control signal generating section 2045 generates a higher control signal including measurement resources and so on. When the first example is applied, the higher control signal generating section 2045 generates two kinds of CRS/PDSCH power ratio patterns. The higher control signal generated in the higher control signal generating section 2045 is output to the data signal generating section 2044 and integrated in the data signal (PDSCH).

The signal multiplexing section 2046 generates a transmission signal by multiplexing the control signal generated in the control signal generating section 2043, the data signal generated in the data signal generating section 2044, and a reference signal generated in an unillustrated reference signal generating section (for example, CRS). The transmission signal generated in the signal multiplexing section 2046 is output to the transmitting/receiving section 203, and transmitted to the mobile terminal apparatus 10 via the amplifying section 202 and the transmitting/receiving antenna 201.

In this way, with the base station apparatus 20 according to the present embodiment, two kinds of CRS/PDSCH power ratios required to demodulate the PDSCH, or their types, can be transmitted to the mobile terminal apparatus 10 in higher control signals or in control signals, so that the mobile terminal apparatus 10 is allowed to determine the CRS/PDSCH power ratio in each subframe. As a result of this, it is possible to allow the mobile terminal apparatus 10 to adequately demodulate the PDSCH that is transmitted in normal subframes and in non-zero power ABSs and that has two kinds of transmit power.

The function blocks of the baseband signal processing section 104 provided in the mobile terminal apparatus 10 will be described with reference to FIG. 15. The function blocks shown in FIG. 15 are simplified to explain the present invention, but is assumed to have configurations which a baseband signal processing section provided in a mobile terminal apparatus should normally have.

Figure 15:
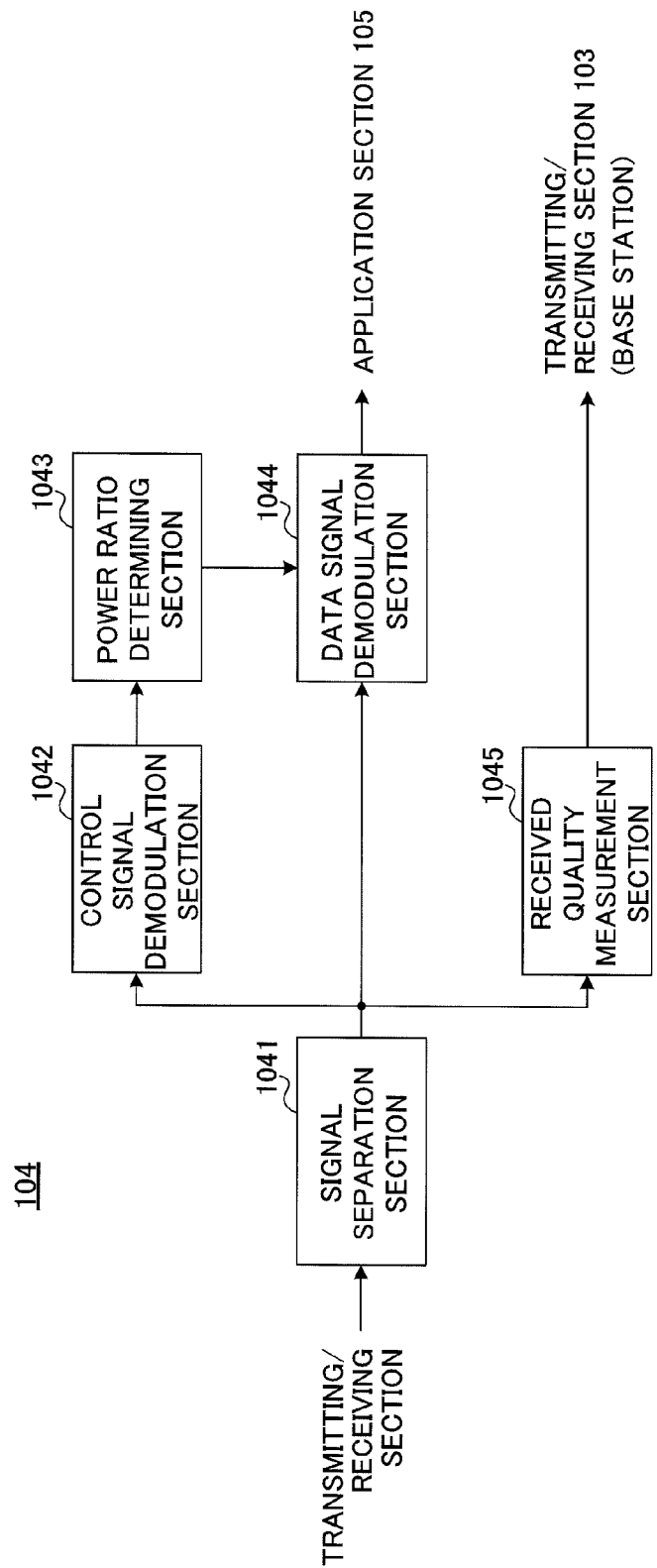
FIG. 15 is a functional block diagram of a baseband signal processing section provided in a mobile terminal apparatus.

As shown in FIG. 15, the baseband signal processing section 104 provided in the mobile terminal apparatus 10 is configured to include a signal separation section 1041, a control signal demodulation section 1042, a CRS/PDSCH power ratio determining section (hereinafter referred to as "power ratio determining section") 1043, a data signal demodulation section 1044, and a received quality measurement section 1045.

The signal separation section 1041 separates a received signal received from the base station apparatus 20 via the transmitting/receiving section 103, into the control signal, the data signal and the reference signal. The control signal, data signal and reference signal separated in the signal separation section 1041 are output to the control signal demodulation section 1042, the data signal demodulation section 1043 and the received quality measurement section 1045, respectively.

The control signal demodulation section 1042 demodulates the control signal received as input from the signal separation section 1041. The control signal demodulation section 1042 determines whether or not the data signal (PDSCH) for the subject apparatus is allocated, from the demodulated control signal. When the first method of the second example is applied, the control signal demodulation section 1042 identifies two kinds of CRS/PDSCH power ratio types from the power ratio type bits included in the DCI format in the PDCCH. When the second method is applied, the control signal demodulation section 1042 identifies two kinds of CRS/PDSCH power ratio types from the UE-IDs included in the DCI format in the PDCCH. When the third method is applied, the control signal demodulation section 1042 identifies two kinds of CRS/PDSCH power ratios from the power ratio setting filed included in the DCI format in the PDCCH.

The power ratio determining section 1043 determines the CRS/PDSCH power ratio set in each subframe. When the first example is applied, the power ratio determining section 1043 determines the CRS/PDSCH power ratio set in each subframe, based on the CRS/PDSCH power ratio patterns reported in advance in higher control signals. When the second example is applied, the power ratio determining section 1043 determines the CRS/PDSCH power ratio set in each subframe, based on the demodulation result in the control signal demodulation section 1042. When the first and second examples are applied, the power ratio determining section 1043 determines the CRS/PDSCH power ratio set in each subframe by using the CRS/PDSCH power ratio patterns reported in higher control signals and the demodulation result in the control signal demodulation section 1042, CRS/PDSCH power ratios that are memorized in advance, or CRS/PDSCH power ratios reported from the base station apparatus 20 separately. When the third example is applied, the power ratio determining section 1043 generates two kinds of CRS/PDSCH power ratio patterns based on the measurement resource 2 reported from the base station apparatus 20, and determines the CRS/PDSCH power ratio set in each subframe in accordance with the power ratio patterns generated. The CRS/PDSCH power ratios determined by the power ratio determining section 1043 are output to the data signal demodulation section 1044.

The data signal demodulation section 1044 demodulates the data signal (PDSCH) allocated in each subframe, using the CRS/PDSCH power ratios determined by the power ratio determining section 1043. By demodulating the data signal in the data signal demodulation section 1044, the transmission signal transmitted from the base station apparatus 20 is reconstructed. Note that the higher control signal included in the data signal is output to the application section 105.

The received quality measurement section 1045 measures received quality based on the reference signal received as input from the signal separation section 1041. The received quality measured in the received quality measurement section 1045 is output to the transmitting/receiving section 103, and transmitted (fed back) to the base station apparatus 20 via the amplifying section 102 and the transmitting/receiving antenna 101.

In this way, with the mobile terminal apparatus 10 according to the present embodiment, two kinds of CRS/PDSCH power ratios required to demodulate the PDSCH, or their types, can be received from the base station apparatus 20 in higher control signals or in control signals, or the CRS/PDSCH power ratio patterns can be generated based on the measurement resource 2 reported from the base station apparatus 20, so that it is possible to determine the CRS/PDSCH power ratio in each subframe. As a result of this, it is possible to adequately demodulate the PDSCH that is transmitted in normal subframes and in non-zero power ABSs and that has two kinds of transmit power.

The present invention is by no means limited to the above embodiment and can be implemented in various modifications. For example, it is possible to implement the method of generating and transmitting two kinds of CRS/PDSCH power ratios required to demodulate the PDSCH in the above description with various changes, without departing from the scope of the present invention. Besides, the present invention can be implemented with various changes, without departing from the scope of the present invention.

The disclosure of Japanese Patent Application No. 2012-017277, filed on Jan. 30, 2012, including the specification, drawings and abstract, is incorporated herein by reference in its entirety.

The invention claimed is:

1. A radio communication system comprising a radio base station and a terminal apparatus that connects with the radio base station, wherein:
the radio base station comprises:
a pattern determining section that determines a power ratio pattern showing a power ratio between a reference signal and a shared data channel signal in each subframe; and
a transmission section that transmits:
a downlink signal including identification information for identifying the power ratio of each subframe in accordance with the determined power ratio pattern; and
control information showing which power ratio is used in accordance with the determined power ratio pattern, included in a downlink control signal, in subframe units, as the identification information,
the terminal apparatus comprises:
a receiving section that receives the downlink signal including the identification information from the radio base station; and
a power ratio determining section that determines a power ratio between a reference signal and a shared data channel in a subframe in accordance with the identification information included in the received downlink signal, wherein the power ratio is determined based on the control information included in the downlink control signal.

2. The radio communication system according to claim 1, wherein, in the radio base station, the pattern determining section determines the power ratio pattern for each terminal apparatus separately.

3. The radio communication system according to claim 2, wherein the radio base station further comprises a scheduler that, when assigning a terminal apparatus for downlink transmission to a subframe of a downlink radio resource, selects the terminal apparatus that is assigned a same power ratio as in the subframe of the downlink radio resource.

4. A radio base station comprising:
a pattern determining section that determines a power ratio pattern showing a power ratio between a reference signal and a shared data channel signal in each subframe; and
a transmission section that transmits a downlink signal including identification information for identifying the power ratio of each subframe in accordance with the determined power ratio pattern,
wherein the transmission section transmits control information showing which power ratio is used in accordance with the determined power ratio pattern, included in a downlink control signal, in subframe units, as the identification information.

5. A terminal apparatus comprising:
a receiving section that receives a downlink signal including identification information for identifying a power ratio between a reference signal and a shared data channel signal in each subframe; and
a power ratio determining section that determines a power ratio between a reference signal and a shared data channel in a subframe in accordance with the identification information included in the received downlink signal,
wherein the power ratio determining section determines the power ratio based on control information included in a downlink control signal in subframe units as the identification information.

6. A radio communication control method for controlling radio communication between a radio base station and a terminal apparatus, the method comprising the steps of:
determining a power ratio pattern showing a power ratio between a reference signal and a shared data channel signal in each subframe; and
transmitting, from the radio base station to the terminal apparatus, a downlink signal including identification information for identifying the power ratio of each subframe in accordance with the determined power ratio pattern, wherein control information is transmitted that shows which power ratio is used in accordance with the determined power ratio pattern, included in a downlink control signal, in subframe units, as the identification information; and
at the terminal apparatus, receiving the downlink signal including the identification information from the radio base station; and
determining a power ratio between a reference signal and a shared data channel in a subframe in accordance with the identification information included in the received downlink signal, wherein the power ratio is determined based on the control information included in the downlink control signal.

* * * * *